United States Patent [19]
Wüstefeld et al.

[11] Patent Number: 5,852,105
[45] Date of Patent: Dec. 22, 1998

[54] AQUEOUS DISPERSIONS COMPRISING A POLYURETHANE, A POLYISOCYANATE AND A TERTIARY ALKANOLAMINE

[75] Inventors: Renate Wüstefeld, Schifferstadt; Ulrike Licht, Mannheim, both of Germany

[73] Assignee: BASF Aktiengesellschaft, Ludwigshafen, Germany

[21] Appl. No.: 841,391

[22] Filed: Apr. 30, 1997

[30] Foreign Application Priority Data

May 8, 1996 [DE] Germany .................. 196 18 389.8

[51] Int. Cl.⁶ .................. C08J 3/00; C08K 3/20; C08L 75/00
[52] U.S. Cl. .................. 524/591; 428/423.1; 524/539; 524/839; 524/840
[58] Field of Search .................. 524/591, 839, 524/840, 539; 428/423.1

[56] References Cited

U.S. PATENT DOCUMENTS 5,227,409  7/1993  Mobley et al. .................. 528/49
5,387,642  2/1995  Blum et al. .................. 524/591

FOREIGN PATENT DOCUMENTS

| 0 469 389 | 2/1992 | European Pat. Off. . |
| 0 542 105 | 5/1993 | European Pat. Off. . |
| 0 562 436 | 9/1993 | European Pat. Off. . |
| 28 22 394 | 11/1978 | Germany . |
| WO 92/16576 | 10/1992 | WIPO . |

*Primary Examiner*—Patrick D. Niland
*Attorney, Agent, or Firm*—Oblon, Spivak, McClelland, Maier & Neustadt, P.C.

[57] ABSTRACT

Aqueous two-component dispersions comprising a) a polyurethane carrying anionic groups which make the polyurethane dispersible in water (component a), b) from 0.04 to 1.5 mol of NCO groups in the form of a water-emulsifiable polyisocyanate (component b) per kg of component (a), and c) from 0.05 to 40 mol of tertiary amino groups in the form of a tertiary alkanolamine (component c) per mole of NCO groups in the form of component (b).

9 Claims, No Drawings

AQUEOUS DISPERSIONS COMPRISING A POLYURETHANE, A POLYISOCYANATE AND A TERTIARY ALKANOLAMINE

The present invention relates to aqueous two-component dispersions comprising a) a polyurethane carrying anionic groups which make the polyurethane dispersible in water (component a), b) from 0.04 to 1.5 mol of NCO groups in the form of a water-emulsifiable polyisocyanate (component b) per kg of component (a), and c) from 0.05 to 40 mol of tertiary amino groups in the form of a tertiary alkanolamine (component c) per mole of NCO groups in the form of component (b).

The invention additionally relates to methods of bonding articles using these mixtures.

Polyurethane dispersions with anionic groups and their use as adhesives are part of general knowledge (cf. D. G. Oertel "Kunststoff Handbuch 7", 2nd Edition, 1983, Carl Hanser Verlag Munich Vienna, pp. 24–25, 571–574 and 591–592).

Also known are two-component adhesive mixtures (two-pack systems) comprising a polyurethane dispersion and a water-emulsifiable isocyanate. The adhesive bonds produced using the two-pack systems are superior to those produced using only the polyurethane dispersion in terms of their strength, especially their strength under the influence of heat (thermal stability) (cf. EP-A-206 059). However, the two-pack systems have to be used up within a certain time period (pot life) after the two components are mixed, since otherwise the adhesive bonds are of inadequate strength. These two-pack systems have the disadvantage that once the open time is exceeded they are irreversibly damaged, and can no longer be used to produce bonds satisfying particular requirements of thermal stability.

Adhesives processors also desire two-pack systems of maximum pot life, since this pot life restricts the processor in organizing his work and gives rise to the danger of adhesive leftovers becoming unusable in the interval between two operating cycles.

It is an object of the present invention, therefore, starting from customary polyurethane dispersions, to provide two-component adhesive mixtures based on polyurethane dispersions and on water-emulsifiable polyisocyanates, which mixtures have a particularly long pot life and can be used to produce bonds of particular thermal stability.

A further object is to provide adhesive dispersions which can be reactivated after the pot life has been exceeded, i.e. can then be reconverted to a form with which it is possible to produce thermally stable bonds.

We have found that these objects are achieved by the aqueous adhesive dispersions defined at the outset and by methods for their preparation and reactivation.

The aqueous two-component dispersions comprise a) a polyurethane carrying anionic groups which make the polyurethane dispersible in water (component a), b) from 0.04 to 1.5 mol, preferably from 0.09 to 1 mol, of NCO groups in the form of a water-emulsifiable polyisocyanate (component b) per kg of component (a), and c) from 0.05 to 40 mol, preferably from 0.05 to 20 mol, of tertiary amino groups in the form of a tertiary alkanolamine (component c) per mole of NCO groups in the form of component (b).

Polyurethanes suitable as component (a) are those which are found in customary commercial aqueous anionic polyurethane dispersions.

Component (a) is customarily prepared in the form of an aqueous dispersion.

Component (a) is preferably composed of a1) diisocyanates of 4 to 30 carbons, a2) diols, of which a2.1) from 10 to 100 mol-%, based on the total quantity of diols (a2), have a molecular weight of 500–5000, and a2.2) from 0 to 90 mol-%, based on the total quantity of diols (a2), have a molecular weight of 60–500 g/mol, a3) monomers which are different from (a1) and (a2) and have at least one isocyanate group or at least one isocyanate-reactive group and, furthermore, carry at least one anionic group or a potentially anionic group, thereby making the polyurethanes dispersible in water, and a4) if desired, other polyvalent compounds, different from monomers (a1) to (a3), having reactive groups which are alcoholic hydroxyls, primary or secondary aminos or isocyanatos, and a5) if desired, monovalent compounds, different from monomers (a1) to (a3), having a reactive group which is an alcoholic hydroxyl, a primary or secondary amino or an isocyanato.

Suitable monomers (a1) are the diisocyanates customarily employed in polyurethane chemistry, especially diisocyanates $X(NCO)_2$, where X is an aliphatic hydrocarbon radical of 4 to 12 carbons, a cycloaliphatic or aromatic hydrocarbon radical of 6 to 15 carbons or an araliphatic hydrocarbon radical of 7 to 15 carbons, examples being tetramethylene, hexamethylene and dodecamethylene diisocyanates, 1,4-diisocyanatocyclohexane, 1-isocyanato-3,5,5-trimethyl-5-isocyanatomethylcyclohexane (IPDI), 2,2-bis-(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis-(4-isocyanatocyclohexyl)methane, and mixtures of these compounds.

Particularly important mixtures of these suitable isocyanates are the mixtures of the respective structural isomers of diisocyanatotoluene and diisocyanatodiphenylmethane, especially the mixture of 80 mol-% 2,4-diisocyanatotoluene and 20 mol-% 2,6-diisocyanatotoluene. Furthermore, the mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI, are particularly advantageous, the preferred ratio of aliphatic to aromatic isocyanates in mixtures being from 4:1 to 1:4.

In the context of good film formation and elasticity, ideal diols (a2) are relatively high molecular mass diols (a2.1) having a molecular weight of about 500–5000, preferably about 100–3000, g/mol.

The diols (a2.1) in particular comprise polyesterpolyols, which are known for example from Ullmanns Encyklopädie der technischen Chemie, 4th Edition, Volume 19, pp. 62–65. It is preferred to employ polyesterpolyols obtained by reacting dihydric alcohols with dibasic carboxylic acids. Instead of the free polycarboxylic acids it is also possible to use the corresponding polycarboxylic anhydrides or polycarboxylic esters of lower alcohols, or mixtures thereof, in order to prepare the polyesterpolyols. The polycarboxylic acids may be aliphatic, cycloaliphatic, araliphatic, aromatic or heterocyclic and may if desired be unsaturated and/or substituted, for example by halogens. Examples of these compounds which may be mentioned are suberic, azelaic, phthalic and isophthalic acids, phthalic, tetrahydrophthalic, hexahydrophthalic, tetrachlorphthalic, endomethylenetetrahydrophthalic, glutaric and maleic anhydrides, and maleic, fumaric and dimeric fatty acids. Preference is given to dicarboxylic acids of the formula HOOC—(CH$_2$)$_y$—COOH, where y is 1–20, preferably an even number from 2 to 20, examples being succinic, adipic, dodecanedicarboxylic and sebacic acids.

Examples of suitable polyhydric alcohols are ethylene glycol, 1,2-propane-, 1,3-propane-, 1,3-butane-, 1,4-butene-, 1,4-butyne- and 1,5-pentanediols, neopentyl glycol, bis (hydroxymethyl)cyclohexanes, such as 1,4-bis (hydroxymethyl)cyclohexane, 2-methyl-1,3-propanediol, methylpentanediols, and also diethylene, triethylene, tetraethylene, polyethylene, dipropylene, polypropylene, dibutylene and polybutylene glycols. Preference is given to alcohols of the formula HO—(CH$_2$)$_x$—OH where x is 1–20, preferably an even number from 2 to 20. Examples of such compounds are ethylene glycol and 1,4-butane-, 1,6-hexane-, 1,8-octane- and 1,12-dodecanediols.

Also suitable are polycarbonatediols as can be obtained, for example, by reacting phosgene with an excess of the low molecular mass alcohols mentioned as structural components for the polyesterpolyols.

Also suitable are lactone-based polyesterdiols, which are homopolymers or copolymers of lactones, preferably adducts of lactones with appropriate difunctional starter molecules, these adducts containing terminal hydroxyls. Suitable lactones are preferably those derived from compounds of the formula HO—(CH$_2$)$_z$—COOH where z is 1–20. Examples are ε-caprolactone, β-propiolactone, gamma-butyrolactone and/or methyl-ε-caprolactone, and mixtures thereof.

Other suitable monomers (a2.1) are polyetherdiols which can be obtained in particular by polymerizing ethylene oxide, propylene oxide, butylene oxide, tetrahydrofuran, styrene oxide or epichlorhydrin with themselves, for example in the presence of BF$_3$, or by subjecting these compounds, alone or as a mixture or in succession, to addition reaction with starting components containing reactive hydrogens, such as alcohols or amines, for example water, ethylene glycol, 1,2-propanediol, 1,3-propanediol, 1,2-bis(4-hydroxydiphenyl)propane or aniline. Particular preference is given to polytetrahydrofurans from the molecular weight range from 240 to 5000, especially 500 to 4500.

The polyols can also be employed as mixtures in proportions from 0.1:1 to 1:9.

The hardness and modulus of elasticity of the polyurethanes can be increased if the diols (a2) used comprise not only diols (a2.1) but also low molecular mass diols (a2.2) having a molecular weight of about 62 to 500, preferably 62 to 200, g/mol.

Monomers (a2.2) employed are, in particular, the structural components of the short-chain alkanediols mentioned for the preparation of polyesterpolyols, with preference being given to unbranched diols of 2 to 12 carbons where the number of carbons is even.

The proportion of diols (a2.1), based on the total quantity of the diols (a2), is preferably from 10 to 100 mol-%, and that of the monomers (a2.2), on the same basis, is from 0 to 90 mol-%. The ratio of diols (a2.1) to monomers (a2.2) is preferably from 0.2:1 to 5:1, particularly preferably from 0.5:1 to 2:1.

To render the polyurethanes dispersible in water, they are composed not only of components (a1), (a2) and (a4) but also of monomers (a3) which are different from components (a1), (a2) and (a4) and carry at least one isocyanate group or at least one isocyanate-reactive group and, furthermore, carry at least one hydrophilic group or a group which can be converted to hydrophilic groups. In the text below the phrase "hydrophilic groups or potentially hydrophilic groups" is shortened to "(potentially) hydrophilic groups". The (potentially) hydrophilic groups react with isocyanates substantially more slowly than the functional groups of the monomers which serve to build the polymer main chain.

The proportion of components with anionic or potentially anionic groups ((potentially) anionic groups) among the total quantity of components (a1), (a2), (a3) and (a4) is generally made such that the molar quantity of (potentially) anionic groups, based on the amount by weight of all monomers (a1) to (a4), is from 30 to 1000, preferably from 50 to 500 and, with particular preference, from 80 to 300 mmol/kg.

Particularly suitable anionic groups are the sulfonate, carboxylate and phosphate groups, in the form of their alkali metal or ammonium salts.

Potentially anionic hydrophilic groups are, in particular, those which can by simple neutralization or hydrolysis reactions be converted into the abovementioned anionic hydrophilic groups, examples thus being carboxyl and anhydride groups. (Potentially) ionic monomers (a3) are described at length, for example, in Ullmanns Encyklop ädie der technischen Chemie, 4th Edition, Volume 19, pp. 311–313 and, for example, in DE-A 1 495 745.

Suitable monomers having (potentially) anionic groups are, customarily, aliphatic, cycloaliphatic, araliphatic or aromatic carboxylic and sulfonic acids carrying at least one alcoholic hydroxyl or at least one primary or secondary amino. Preference is given to dihydroxyalkylcarboxylic acids, especially those of 3 to 10 carbons, as are described in US-A 3 412 054. Particularly preferred compounds are those of the formula

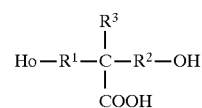

in which R$^1$ and R$^2$ are C$_1$-C$_4$-alkanediyl and R$^3$ is C$_1$-C$_4$-alkyl, and especially dimethylolpropionic acid (DMPA).

Also suitable are appropriate dihydroxysulfonic acids and dihydroxyphosphonic acids, such as 2,3-dihydroxypropanephosphonic acid.

Other suitable compounds are dihydroxy compounds with a molecular weight from above 500 to 10,000 g/mol which have at least 2 carboxylate groups, and which are known from DE-A 3 911 827.

Suitable monomers (a3) having isocyanate-reactive amino groups are aminocarboxylic acids, such as lysine, β-alanine, the adducts of aliphatic diprimary diamines with α,β-unsaturated carboxylic acids mentioned in DE-A 2 034 479, such as N-(2-aminoethyl)-2-aminoethanecarboxylic acid, and the corresponding N-aminoalkyl-aminoalkylcarboxylic acids, in which the alkanediyls are each of 2 to 6 carbons.

Where monomers with potentially ionic groups are employed, their conversion to the ionic form may take place prior to, during or, preferably, after the isocyanate polyaddition reaction, since the ionic monomers are frequently of only poor solubility in the reaction mixture. With particular preference the carboxylate groups are present in the form of their salts with an alkali metal ion or an ammonium ion as counterion.

The monomers (a4), which are different from monomers (a1) to (a3), serve generally for crosslinking or chain extension. They are in general nonaromatic alcohols with a functionality higher than 2, amines having 2 or more primary and/or secondary amino groups, and compounds with not only one or more alcoholic hydroxyls but also one or more primary and/or secondary aminos.

Polyamines with 2 or more primary and/or secondary aminos are used in particular when chain extension and/or crosslinking is to take place in the presence of water, since amines generally react more quickly with isocyanates than do alcohols or water. This is frequently necessary when aqueous dispersions of crosslinked polyurethanes or of polyurethanes of high molecular weight are desired. In such cases the procedure is to prepare prepolymers containing isocyanate groups, to disperse these prepolymers rapidly in water and then to carry out chain extension or crosslinking by adding compounds having two or more isocyanate-reactive aminos.

Amines suitable for this purpose are generally polyfunctional amines with molecular weights in the range from 32 to 500 g/mol, preferably from 60 to 300 g/mol, containing at least two primary, two secondary or one primary and one secondary amino. Examples of such compounds are diamines, such as diaminoethane, diaminopropanes, diaminobutanes, diaminohexanes, piperazine, 2,5-dimethylpiperazine, amino-3-aminomethyl-3,5,5-trimethyl-cyclohexane (isophoronediamine, IPDA), 4,4'-diaminodicyclohexylmethane, 1,4-diaminocyclohexane, aminoethylethanolamine, hydrazine, hydrazine hydrate or triamines, such as diethylenetriamine or 1,8-diamino-4-aminomethyloctane.

The amines can also be employed in blocked form, for example in the form of corresponding ketimines (see for example CA-1 129 128), ketazines (cf. e.g. US-A 4 269 748) or amine salts (see US-A 4 292 226).

It is preferred to use mixtures of di- and triamines, especially mixtures of isophoronediamine and diethylenetriamine.

The polyurethanes preferably contain no polyamine or from 1 to 10 mol-%, preferably from 4 to 8 mol-%, based on the total quantity of components (a2) and (a4), of a polyamine having at least 2 isocyanate-reactive amino groups as monomer (a4).

Examples of alcohols with a functionality of more than 2 which may be used to establish a certain degree of branching or crosslinking are trimethylolpropane, glycerol and sucrose.

For the same purpose it is also possible to employ, as monomers (a4), trivalent and tetravalent isocyanates. Examples of commercially available compounds are the isocyanurate or the biuret of hexamethylene diisocyanate.

Monomers (a5), which may be used if desired, are monoisocyanates, monoalcohols and primary and secondary monoamines. Their proportion is generally not more than 10 mol-%, based on the total molar quantity of monomers. These monofunctional compounds usually carry further functional groups, such as olefinic groups or carbonyl groups, and serve to introduce into the polyurethane functional groups which permit the dispersion or crosslinking or further polymer-analogous reaction of the polyurethane. Suitable such monomers are isopropenyl-$\alpha,\alpha$-dimethylbenzyl isocyanate (TMI) and esters of acrylic or methacrylic acid, such as hydroxyethyl acrylate or hydroxyethyl methacrylate.

In the field of polyurethane chemistry it is generally known how the molecular weight of the polyurethanes can be adjusted by selecting appropriate proportions of the mutually reactive monomers and the arithmetic mean of the number of reactive functional groups per molecule.

Normally, components (a1)–(a4) and their respective molar quantities are chosen such that the ratio A:B where A) is the molar quantity of isocyanate groups and B) is the sum of the molar quantity of hydroxyl groups and the molar quantity of functional groups which are able to undergo an addition reaction with isocyanates, is from 0.5:1 to 2:1, preferably from 0.8:1 to 1.5, particularly preferably from 0.9:1 to 1.2:1. With very particular preference, the ratio A:B is as close as possible to 1:1.

In addition to components (a1)–(a4) use is made of monomers having only one reactive group, generally in quantities of up to 15 mol-%, preferably up to 8 mol-%, based on the total quantity of components (a1)–(a4).

The monomers (a1) to (a4) employed carry on average, usually, from 1.5 to 2.5, preferably from 1.9 to 2.1, particularly preferably 2.0, isocyanate groups or functional groups which are able to undergo an addition reaction with isocyanates.

The polyaddition of components (a1) to (a4) is generally carried out by known techniques, preferably employing the acetone process or the prepolymer mixing process, which are known, for example, from DE-A-44 18 157.

In this case the general procedure is first, in an inert organic solvent, to prepare a prepolymer or the polyurethane (a) and then to disperse the prepolymer or the polyurethane (a) in water. In the case of the prepolymer, reaction to form the polyurethane (a) takes place by reaction with water or by means of a subsequently added amine (component a4). Normally, some or all of the solvent is removed by distillation after dispersion.

The dispersions generally have a solids content of from 10 to 75% by weight, preferably from 20 to 65% by weight, and a viscosity of from 10 to 500 m Pas (measured at 20° C. and a shear rate of 250 s$^{-1}$).

Hydrophobic auxiliaries, which in some cases are difficult to disperse homogeneously in the finished dispersion, for example phenol condensation resins of aldehydes and phenol and/or phenol derivatives, or epoxy resins and other polymers mentioned, for example, in DE-A 39 03 538, 43 09 079 and 40 24 567, which are used for example as adhesion promoters in polyurethane dispersions, can be added to the polyurethane or to the prepolymer even prior to dispersion in accordance with the methods described in the two above-mentioned documents.

Suitable water-emulsifiable isocyanates (component (b)) are likewise those which are generally known, for example those described in EP-A-0 206 059 (German Patent Application P 4429446.8).

These are (cyclo)aliphatic or aromatic diisocyanates, or polyisocyanates (b1) of higher functionality, which in part have been reacted with compounds having at least one hydrophilic group and at least one isocyanate-reactive group (compounds b2).

Examples of suitable polyisocyanates (b1) are straight-chain or branched $C_4$-$C_{14}$-alkylene diisocyanates, cycloaliphatic diisocyanates with a total of 6 to 12 carbons, aromatic diisocyanates with a total of 8 to 14 carbons, polyisocyanates containing isocyanurate groups, uretdione diisocyanates, polyisocyanates containing biuret groups, polyisocyanates containing urethane groups or allophanate groups, polyisocyanates containing oxadiazinetrione groups, uretoneimine-modified polyisocyanates, or mixtures thereof.

Diisocyanates (b1) preferably employed are the same as those suitable for preparing component (a).

Examples of polyisocyanates (b1) with a functionality of three or more are polycyclic homologs of the abovementioned aromatic diisocyanates.

Preference is given to aliphatic or cycloaliphatic polyisocyanates, for example the diisocyanates mentioned above, mixtures thereof, or b1.1) Polyisocyanates, containing isocyanurate groups, of aliphatic and/or cycloaliphatic diisocyanates. Particular preference here is given to the corresponding isocyanatoisocyanurates based on hexamethylene diisocyanate and isophorone diisocyanate. The isocyanurates present are in particular simple tris-isocyanatoalkyl or tris-isocyanatocycloalkyl isocyanurates, which represent cyclic trimers of the diisocyanates, or are mixtures with their higher homologs containing more than one isocyanurate ring. The isocyanatoisocyanurates generally have an NCO content of from 10 to 30% by weight, especially from 15 to 25% by weight, and a mean NCO functionality of from 3 to 4.5.

b1.2) Uretdione diisocyanates having isocyanate groups attached to aliphatic and/or cycloaliphatic structures, derived preferably from hexamethylene diisocyanate or isophorone diisocyanate. Uretdione diisocyanates are cyclic dimerization products of diisocyanates.

The uretdione diisocyanates can be employed in the novel formulations as sole component or as a mixture with other polyisocyanates, especially those mentioned under b1.1).

b1.3) Polyisocyanates containing biuret groups and isocyanate groups attached to aliphatic structures, especially tris(6-isocyanatohexyl)biuret or mixtures thereof with its higher homologs. These biuret group-containing polyisocyanates generally have an NCO content of from 18 to 22% by weight and a mean NCO functionality of from 3 to 4.5.

b1.4) Polyisocyanates containing urethane groups and/or allophanate groups and isocyanate groups attached to aliphatic or cycloaliphatic structures, as can be obtained, for example, by reacting excess amounts of hexamethylene diisocyanate or of isophorone diisocyanate with simple polyhydric alcohols, for example trimethylolpropane, glycerol, 1,2-dihydroxypropane or mixtures thereof. These polyisocyanates containing urethane groups and/or allophanate groups generally have an NCO content of from 12 to 20% by weight and a mean NCO functionality of from 2.5 to 3.

b1.5) Polyisocyanates containing oxadiazinetrione groups, derived preferably from hexamethylene diisocyanate or isophorone diisocyanate. Polyisocyanates of this kind, containing oxadiazinetrione groups, can be prepared from diisocyanate and carbon dioxide.

b1.6) Uretoneimine-modified polyisocyanates.

The polyisocyanates (b1.1) to (b1.6) can be employed as a mixture, possibly with diisocyanates.

To prepare the water-emulsifiable polyisocyanates the above polyisocyanates (b1) are reacted with compounds (b2) containing at least one, preferably one hydrophilic group and at least one, preferably one isocyanate-reactive group, for example a hydroxyl, mercapto or primary or secondary amino group (NH group for short).

The hydrophilic group may for example be an ionic group or a group which can be converted to an ionic group.

Anionic groups or groups which can be converted to anionic groups are, for example, acidic groups, such as carboxyl or sulfo groups, which are neutralized.

Examples of suitable compounds (b2) are hydroxycarboxylic acids, such as hydroxypivalic acid or dimethylolpropionic acid, or hydroxy- or amino-sulfonic acids.

Groups which can be converted into ionic groups are preferably converted into ionic groups prior to or during dispersion of the novel mixture in water.

To convert, for example, carboxyl groups or sulfo groups to anionic groups it is possible to employ inorganic and/or organic bases, such as sodium hydroxide, potassium hydroxide, potassium carbonate, sodium bicarbonate, ammonia or primary, secondary and, in particular, tertiary amines, for example triethylamine or dimethylaminoethanol.

Other suitable neutralizing agents are the alkanolamines employed as component (c). Stoichiometric or substoichiometric amounts of alkanolamines, based on the quantity of acid groups to be neutralized, which are used to neutralize these acidic groups are not calculated as part of the defined quantity of component (c), since they are essentially no longer present as free bases. Examples of nonionic groups are polyalkylene ether groups, especially those with 10 to 80 alkylene oxide units. Preference is given to polyethylene ether or polyalkylene ether groups which in addition to other alkylene oxide units, for example propylene oxide, contain at least 10 ethylene oxide units.

Examples of suitable compounds are polyalkylene ether alcohols.

The content of hydrophilic nonionic groups, especially polyalkylene ether groups, is preferably from 0.5 to 20% by weight, particularly preferably from 1 to 15% by weight, based on the water-emulsifiable polyisocyanates.

The preparation of the water-emulsifiable polyisocyanates is known from DE-A-35 21 618, DE-A-40 01 783 and DE-A-42 03 510.

In the preparation of the water-emulsifiable polyisocyanates it is possible to react the compounds having at least one hydrophilic group and at least one isocyanate-reactive group with some of the polyisocyanate and then to mix the resulting, hydrophilically modified polyisocyanates with the other polyisocyanates. However, they can also be prepared by adding the compounds to the total amount of polyisocyanates and then carrying out the reaction in situ.

Preferred water-emulsifiable polyisocyanates (b) are those containing hydrophilic nonionic groups, especially polyalkylene ether groups. In this case emulsifiability in water is preferably brought about solely by means of the hydrophilic nonionic groups.

Particularly suitable tertiary alkanolamines (component c) are those of the formula I

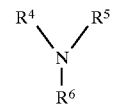

in which $R^4$, $R^5$ and $R^6$ are hydroxy-$C_1$-$C_6$-alkyl, polyethylene oxide or polypropylene oxide (preferably with 2–5 ethylene or propyleneoxy units), $C_1$-$C_6$-alkyl, $C_5$-$C_{10}$-cycloalkyl or $C_6$-$C_{12}$-aryl, with the proviso that at least one, preferably two or all of $R^4$, $R^5$ and $R^6$ are polyethylene or polypropylene oxide, preferably with 2 to 5 ethylene or propylene oxide units or are hydroxy-$C_1$-$C_6$-alkyl.

Preferred hydroxy-$C_1$-$C_6$-alkyls $R^4$, $R^5$ and $R^6$ are hydroxymethyl, hydroxyethyl and hydroxypropyl (n or iso).

Particularly suitable amines for use as component c are the following:

Trishydroxymethylamine

N(CH₂—OH)₃

Amines C1

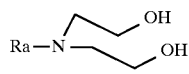

Amines C2

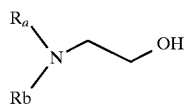

Tripropanolamines (n or iso)

N(C₃H₇—OH)₃

Amines C3

Ra—N—(C₃H₇—OH)₂

Trisethoxyethanolamine

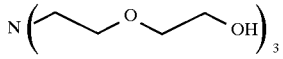

Amines C4

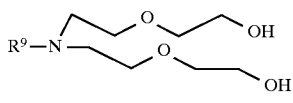

Amines C5

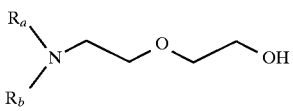

3-Diethanolamino-1,2-propanediol

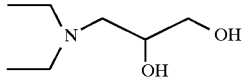

Triethanolamine

N—(—CH₂—CH₂—OH)₃

In the case of amines C1, C2, C3, C4 and C5 the radicals $R^a$ and $R^b$ respectively are $C_1$-$C_6$-alkyl, preferably methyl, ethyl or n- or isopropyl, $C_5$-$C_{10}$-cycloalkyl, or $C_6$-$C_{10}$-aryl.

In addition to triethanolamine, dimethylethanolamine and monomethyldiethanolamine are particularly preferred.

The novel aqueous dispersions can be prepared simply, by mixing a) an aqueous dispersion containing a polyurethane which carries anionic groups which make the polyurethane dispersible in water (initial dispersion a), b) a water-emulsifiable polyisocyanate (component b), and c) a tertiary alkanolamine.

The way in which these components are mixed is not critical and may, for example, be by stirring them together. Aqueous dispersions comprising components (a) and (c) but not (b) can be stored ad infinitum. Therefore, the mixture of (a) and (c) can be added even prior to the dispersion of (a) in water. Owing to the limited pot life of the mixture, component (b) is expediently added just before processing begins.

The novel aqueous two-component dispersions may comprise customary commercial auxiliaries and additives, such as blowing agents, antifoams, emulsifiers, thickeners and thixotropic agents, and colorants such as dyes and pigments.

The best adhesive properties are had by so-called fresh two-component dispersions, which have been prepared from "fresh" initial dispersions (a), i.e. those to which no effective quantities of component (b) have been added at any time previously.

If the novel fresh aqueous two-component dispersions are stored too long, so that their content of NCO groups in the form of component (b) falls from an original level of from 0.05 to 1.5 mol of NCO groups in the form of component (b) to less than 50 mol-% of NCO groups in the form of component (b), based on those in the fresh aqueous two-component dispersion, and therefore the pot life—the time within which the dispersion is to be processed—is exceeded, the result is two-component dispersions referred to as "aged". The aged two-component dispersions can be reactivated and converted to the novel aqueous two-component dispersions by adding to them again a quantity of NCO groups, in the form of component (b), which is such that the proportion of component (b) is from 50 to 200 mol-% of NCO groups in the form of component (b) per kg of component (a), based on those in the fresh aqueous two-component dispersion.

The NCO content of an aged two-component dispersion is determined most easily by recording an IR spectrum, expediently with the aid of a commercial FTIR instrument fitted with a horizontal ATR (Attenuated Total Reflection) unit. The ATR method is known, for example, from H. H. Perkampus, Lexikon Spektroskopie VCH, 1993. For measurement, a drop of the dispersion is applied to the crystal and is covered with a glass slide. The spectrum can then be recorded in the usual manner. The water is not an interference to consideration of the NCO band. The result of this measurement can be evaluated with the aid of a calibration measurement, carried out with aqueous two-component dispersions containing a defined quantity of NCO groups in the form of component (b), for example from 0 to 1.5 mol per kg of (a) in steps of 0.1 mol. These two-component dispersions are obtained by mixing a fresh initial dispersion (a) with the respective amounts of component (b). The calibration measurement is carried out in accordance with the above-described IR method directly after the two components have been mixed, so as to make sure that all of the quantity of NCO groups added is still present in the mixture at the moment of measurement. By comparing the height of the NCO band in the spectrum of the aged dispersion with that of the bands in the spectra from the calibration measurements, the NCO content in the form of component (b) in the aged two-component dispersions can be estimated with sufficient accuracy.

Should the required analytical technology not be available in practice, then it is advisable to reactivate the aged dispersion by adding 100 mol-% of NCO groups in the form of component (b), based on those present in the fresh aqueous two-component dispersion.

Although the novel two-component dispersions prepared by reactivating the aged two-component dispersions do not have adhesion properties quite as good as those of the fresh two-component dispersions, the level of their properties is still sufficient in practice for most requirements.

The novel aqueous two-component dispersions may contain customary commercial auxiliaries and additives, such as blowing agents, antifoams, emulsifiers, thickeners and thixotropic agents, and colorants such as dyes and pigments.

The novel dispersions are suitable for bonding a wide variety of substrates in accordance with the methods generally known for aqueous dispersions in the field of adhesives processing.

Examples of suitable articles are those made of wood, wood fibers, metal, plastic or leather, for example films of all kinds, especially furniture films, or plastic foam.

In order to obtain bonds of particular thermal stability, the general procedure is to carry out the following steps:

I$a$. preparation of a coating I$a$ by coating parts of an article with the novel aqueous two-component dispersion, II$a$. preparation of a coating II$a$ by drying the coating I$a$, and III$a$. preparation of a bond III$a$ by bringing into contact the surface of the coating II$a$ with itself, with part of the surface of the article which is not coated with the coating II$a$, or with the surface of another article, the coating II$a$ being at 20°–200° C.

In accordance with a further preferred bonding method, the procedure comprises:

I$b$. preparation of a coating I$b$ by coating parts of an article with the aqueous two-component dispersion, II$b$. preparation of a coating II$b$ by drying the coating I$b$, III$b$. preparation of a coating III$b$ by heating the coating II$b$ to 30°–100° C., and IV$b$. preparation of a bond IV$b$ by bringing into contact the surface of the coating III$b$ with itself, with part of the surface of the article which is not coated with the coating II$b$, or with the surface of another article, within a period of 15 minutes after cooling the coating III$b$ to 30°–80° C.

Owing to the limited pot life of the aqueous two-component dispersion it is generally necessary to mix component (b) with the aqueous dispersion containing component (a), in order to prepare the aqueous two-component dispersion, and to prepare the coatings II$a$ or II$b$ within a period of 1 d, preferably within 10 h.

The period between preparing the coatings II$a$ or II$b$ and the production of the bonds should preferably be no longer than 10 h.

The method comprising steps I$b$ to IV$b$ has proven particularly suitable in the case of polyurethane dispersions prepared using as component (a2) at least 50% by weight of a polyester of adipic acid and butane- or hexanediol.

The coating I$a$ or I$b$ is advantageously prepared by customary methods, such as spraying, pouring or knife-coating.

When applying the dispersion II$a$ or II$b$ it is frequently possible to do without a separate drying step since a large proportion of the water evaporates even in the course of spraying.

The coating I$a$ or I$b$ (preparation of the coating I$a$ or II$b$, respectively) can be dried at room temperature or at elevated temperature, for example at from 40° to 150° C., by irradiation with infrared light.

After they have dried, coatings II$a$ and II$b$ normally include less than 5% by weight of water.

If the coating I$b$ is dried at at least 30° C., then the preparation of the coating II$b$ and III$b$ takes place simultaneously in one step.

Otherwise, coating III$b$ can be prepared from the coating II$b$ likewise by irradiation with infrared light or by heating in a stream of hot air at a later point in time.

The bonds III$a$ and IV$b$ are usually produced in presses, using a pressure of from 0.05 to 5 N/mm$^2$. In the case of bonds III$a$, heated presses are normally used to produce them.

The technique of bonding by bringing into contact the surface of the coatings II$a$ or III$b$ with themselves or with other parts of the surface of the article does of course require the article to which the coating is applied to be flexible, as for example in the case of films and foils. This technique is employed, for example, in the packaging industry. Parts of a film coated with the coatings II$a$ or III$b$ are folded, for example, and the overlying film parts are bonded at appropriate points to produce pouches or bags.

Bonding techniques in which the coating II$a$ or III$b$ is bonded with the surface of another article are employed, for example, for producing composite structures comprising fiber board with PVC film. These composite materials find their application in fitting out the interior of automobiles. Particularly high composite strength levels are achieved if the surface of the other article likewise carries a coating II$a$ or III$b$, respectively. The materials of the articles to be bonded to one another may be identical or different.

A particular feature of the novel aqueous two-component dispersions is that they have a particularly long pot life, i.e. they can be stored for a prolonged period without becoming unusable for the production of thermally stable adhesive bonds. Moreover, when the pot life has expired they can be reactivated; in other words, after adding polyisocyanate they are again suitable for producing bonds of high thermal stability.

Abbreviations

RT=Room temperature
OHN=Hydroxyl number
TDI=Tolylene diisocyanate
HDI=Hexamethylene diisocyanate
PUD salt=Na salt of the Michael adduct of acrylic acid and ethylenediamine
DBTL=Dibutyltin dilaurate
solids=Solids content.

The viscosities of the dispersions were measured at 20° C. at a shear rate of $250s^{-1}$ using a rotary rheometer having concentric cylinders (spindle diameter 38.7 mm, cup diameter: 42.0 mm).

The size of the latex particles (LD) was determined indirectly via turbidity measurements. For this purpose the turbidity of a dispersion having a solids content of 0.01% by weight was determined relative to distilled water at a path length of 2.5 cm and at room temperature.

Preparation of the initial dispersion (a)

718.8 g of a polyester of adipic acid and 1,4-butanediol (OHN=44.5) were reacted with 32.98 g of TDI together with 0.12 g of DBTL in 191.2 g of acetone for 1 h at 65° C. Then 31.8 g of HDI were metered in and reaction was continued for 70 minutes. The mixture was diluted with 766.4 g of acetone and cooled at the same time to 50° C. The NCO value was 0.54%. 40.95 g of PUD salt were added, in the form of a 40% strength solution in water, and the mixture was dispersed with 1200 g of fully deionized water. The acetone was removed by distillation under reduced pressure and the solids content was adjusted to 40%.

Analytical data

Solids: 40%
LD: 84.8
Visc.: 38.8 mpas
pH: 8.5.

Preparation of the aqueous two-component dispersions and performance testing thereof Examples 1 to 4

2 parts by weight of triethanolamine were added to 100 parts of initial dispersion (a) and the mixture was stirred for 5 minutes. It was then thickened with 2% by weight of an associated thickener (Collacral® VL), and 4 parts by weight of an 80% strength by weight solution of a water-dispersible polyisocyanate in propylene carbonate were added. The dispersions of Examples 1 to 3 were subsequently stored for the time indicated in Table 1 ("open time"), before being subjected to performance testing, i.e. applied to the test specimen. In the case of Example 4, the procedure used for Example 3 was repeated but, directly before using the dispersion, a further 4% by weight of the solution of the water-emulsifiable polyisocyanate were stirred in.

The aqueous two-component dispersions were processed by knife application (in a wet amount of 60 g/m$^2$) to MDF boards (medium-density fiber boards) with an area of 140× 50 mm². The coatings were dried at RT for 1 hour. Bonding was then carried out with a PVC furniture film (thickness= 450 μm) by compression under a pressure of 0.6 N/mm² at 80° C. after 10 seconds.

The thermal stability was tested after 24 h, by first of all conditioning the test specimens at 80° C. for 3 minutes. The PVC film was then subjected at a peel angle of 180° to a load of 500 g (or 1000 g) on the side measuring 50 mm and conditioned at 80° C. for 15 minutes. A record was made of the tear length in mm.

For comparison, the tests were repeated but without adding triethanolamine to the initial dispersions. These comparison tests are each identified with a V.

TABLE 1

| Example | open time [h] | Length of tear with 500 g weight [mm] | Length of tear with 1000 g weight [mm] |
|---|---|---|---|
| 1 (V) | 0 | 5 | 6 |
| 1 | 0 | 3 | 8 |
| 2 (V) | 5 | 2 | 20 |
| 2 | 5 | 2 | 11 |
| 3 (V) | 24 | torn off | torn off |
| 3 | 24 | 25 | 79 |
| 4 (V) | 24 | 8 | torn off |
| 4 | 24 | 6 | 18 | open time: Time between adding the isocyanate and applying the formulation by knife-coating to the MDF board

We claim:

1. An aqueous two-component dispersion comprising
   a) a polyurethane carrying anionic groups which make the polyurethane dispersible in water (component a),
   b) from 0.04 to 1.5 mol of NCO groups in the form of a water-emulsifiable polyisocyanate (component b) per kg of component (a), and
   c) from 0.05 to 40 mol of tertiary amino groups in the form of a tertiary alkanolamine (component c) per mole of NCO groups in the form of component (b).

2. A dispersion as claimed in claim 1, in which the polyurethane (component a) is composed of
   a1) diisocyanates of 4 to 30 carbons,
   a2) diols, of which
      a2.1) from 10 to 100 mol-%, based on the total quantity of diols (a2), have a molecular weight of 500–5000, and
      a2.2) from 0 to 90 mol-%, based on the total quantity of diols (a2), have a molecular weight of 60–500 g/mol,
   a3) monomers which are different from (a1) and (a2) and have at least one isocyanate group or at least one isocyanate-reactive group and, furthermore, at least one anionic group or a potentially anionic group, thereby making the polyurethanes dispersible in water, and
   a4) if desired, other polyvalent compounds, different from monomers (a1) to (a3), having reactive groups which are alcoholic hydroxyls, primary or secondary aminos or isocyanatos, and
   a5) if desired, monovalent compounds, different from monomers (a1) to (a3), having a reactive group which is an alcoholic hydroxyl, a primary or secondary amino or an isocyanato.

3. A dispersion as claimed in claim 1 or 2, in which component (b) is a polyisocyanate comprising polyethylene oxide groups or polypropylene oxide groups.

4. A dispersion as claimed in any of claims 1 to 3, in which the tertiary alkanolamine is triethanolamine.

5. A process for preparing a dispersion as claimed in any of claims 1 to 4 by
   preparing a fresh aqueous two-component dispersion by mixing component (b) with an aqueous dispersion comprising a polyurethane (a), no effective quantities of component (b) having been added to this dispersion at any time previously (fresh initial dispersion a), and with component (c), component (c) possibly having been present in the fresh initial dispersion (a) even at an earlier point in time, and choosing the proportions such that directly after the fresh aqueous two-component dispersion has been prepared it comprises
      b) from 0.04 to 1.5 mol of NCO groups in the form of component (b) per kg of component (a), and
      c) from 0.05 to 40 mol of component (c) per mole of NCO groups in the form of component (b),
   storing the fresh aqueous two-component dispersions until an aged two-component dispersion has formed whose content of NCO groups in the form of component (b) is less than 50 mol-% of NCO groups in the form of component (b), based on the original content of (b) in the fresh aqueous two-component dispersion; and
   mixing the aged aqueous two-component dispersion with a quantity of NCO groups, in the form of component (b), which is such that the content thereof is from 50 to 200 mol-% per kg of component (a), based on the original content of (b) in the fresh aqueous two-component dispersion.

6. An aqueous two-component dispersion obtained by a process as claimed in claim 5.

7. A method of bonding articles, which comprises carrying out the following steps:
   Ia. preparation of a coating Ia by coating parts of an article with a dispersion as claimed in any of claims 1 to 4 and 6,
   IIa. preparation of a coating IIa by drying the coating Ia, and
   IIIa. preparation of a bond IIIa by bringing into contact the surface of the coating IIa with itself, with part of the surface of the article which is not coated with the coating IIa, or with the surface of another article, the coating IIa being at 20°–200° C.

8. A method of bonding articles, which comprises carrying out the following steps:
   Ib. preparation of a coating Ib by coating parts of an article with a dispersion as claimed in any of claims 1 to 4 and 6,
   IIb. preparation of a coating IIb by drying the coating Ib,
   IIIb. preparation of a coating IIIb by heating the coating IIb to 30°–100° C., and
   IVb. preparation of a bond IVb by bringing into contact the surface of the coating IIIb with itself, with part of the surface of the article which is not coated with the coating IIb, or with the surface of another article, within a period of 15 minutes after cooling the coating IIIb to 30°–80° C.

9. A bonded article obtained by a method as claimed in claim 7 or 8.

* * * * *